Reissued Dec. 2, 1930 Re. 17,894

UNITED STATES PATENT OFFICE

ALBERT BODMER, OF WATTWIL, SWITZERLAND, ASSIGNOR TO HEBERLEIN & CO., A. G., OF WATTWIL, SWITZERLAND, A CORPORATION OF SWITZERLAND

DYEING

No Drawing. Original No. 1,694,526, dated December 11, 1928, Serial No. 121,736, filed July 10, 1926, and in Germany July 14, 1925. Application for reissue filed September 14, 1929. Serial No. 392,749.

My invention relates to improvements in dyeing and more particularly the main object of the invention is to provide an improved method for treating cellulosic fibers or fabrics to render the same relatively immune to substantive dyestuffs and also certain novel products which may be produced with the aid thereof. Further and more specific objects, features and advantages will more clearly appear from the detailed description given below in which preferred forms of the invention are fully set forth.

Heretofore certain methods have been proposed for changing the dyeing properties of vegetable or cellulosic fibers by way of acetylating, benzoating or the like, but these methods have certain disadvantages. According to the present invention in its preferred form the vegetables or cellulosic fibers or fabric are treated with a phosphorous halogen compound whereby novel and valuable products are obtained. If the material is treated with alcoholic caustic alkali in connection with the treatment with the phosphorous halogen compound the material becomes immune to substantive dyes and has as well an affinity for basic dyestuffs. If the caustic is employed in water solution, for example as a water paste in printing, the immunity to substantive dyestuffs is not satisfactory although an increase in the affinity for basic dyestuffs does occur. In addition to purely inorganic phosphorous halogen compounds such as phosphorous trichloride, phosphorous oxychloride, etc. organically substituted phosphorous halogen compounds such as ethyl-phosphoxy-chloride and other phosphorous compounds such as triphenyl-phosphate may be used with more or less success.

For the purpose of rendering the cellulose fibers immune to substantive dyestuffs and increasing their affinity for basic dyes, cotton yarn is immersed in a solution of caustic soda in alcohol, containing 10% of caustic soda by weight, to alkalize the cellulosic fibers thereof in a manner well understood by those skilled in the art, and after removing the yarn from the solution the excess of solution is squeezed out of the same. The yarn thus prepared is then brought into a solution of phosphorous trichloride in xylol containing 200 grams of phosphorous trichloride per liter of xylol. Thus the cotton fibers of the yarn are treated with the phosphorous halogen compound in the presence of some alkali which remains on the yarn from the alkalizing treatment. When the yarn is thus treated with the phosphorous trichloride solution the reaction takes place after a short time, with development of heat. The yarn is then thoroughly washed, soaped and dried and it is found that the fibers have lost their affinity for and are substantially immune to substantive dyestuffs while they have acquired a pronounced capacity for dyeing with basic dyestuffs without previous mordanting.

The yarn so treated may be woven together with ordinary cotton yarn or untreated cellulosic threads to form a fabric and remains in the fabric as a white effect when the fabric is dyed with substantive dyestuffs. If desired, the yarn before the treatment with the phosphorous compound, may be colored, as for example with substantive dyestuff, and then rendered immune to further dyeing with substantive dyestuffs by the treatment as above described and then the yarn woven together with untreated cotton yarn or cellulosic threads, and the fabric treated with a substantive dyestuff of a different color, whereupon the threads which have been treated with the phosphorous compound will remain of a different color from those which were untreated with the phosphorous compound. The reaction of the phosphorous halogen compound on the cellulose appears to set free halogen acid and the presence of alkali on the goods will serve to remove such acid by neutralizing the same thus preventing its injuring the goods. The phosphorous I believe combines with the cellulosic material to form a phosphorous cellulose compound which is relatively resistant and immune to substantive dyestuffs and relatively attractive to basic dyestuffs, generally speaking.

Instead of treating the yarn before it is woven into fabric, a woven fabric made of cotton or cellulosic fibres may be first treated with an aqueous caustic alkali solution in the well known way to alkalize the cellulose thereof and then the excess alkali solution squeezed out and the fabric passed through a 10% solution by weight of phosphorous oxychloride in benzol. Various other hydrocarbon solvents may be used for producing the solution of the phosphorous compound or compounds. After completion of the reaction the material may be washed and may then be dyed with basic dyestuffs without previous mordanting.

The invention may be applied not only to ordinary cotton fibers and fabrics but also to artificial silk fibers and fabrics, such as artificial silk made from regenerated cellulose, e. g. hydracellulose such as viscose, cupra ammonia cellulose and collodion silk. Such artificial silk may be treated with the phosphorous halogen compounds or the like and alcoholic caustic alkali, and it will then be found to have become substantially immune to substantive dyestuffs and to have acquired an affinity and attraction for basic dyestuffs. If these silks are treated with water solutions of caustic alkali or with water paste containing caustic alkali, they acquire an affinity for basic dyes, but they do not acquire a satisfactory immunity to substantive dyes. Therefore, by cellulosic fibers, and fabrics or material I intend to include all such artificial silk as well as other cellulosic material. With artificial silks which consist of cellulose esters or cellulose ethers, e. g. acetate silk, and which repel most of the common dyestuffs, their affinity for basic dyestuffs becomes marked when treated in the manner described.

The treatment with alkali may be applied after instead of before the treatment with the phosphorous compound. Thus it is not necessary that the cellulosic material be treated with the phosphorous compound in the presence of the alkali and the cellulosic material may be washed with water or with an inert solvent and dried, if desired, between the two treatments. Also in many cases the alkali treatment may be omitted altogether and substantially the same results obtained, as obtained by the use of water solution of caustic alkali.

The cellulosic material may be directly treated with the phosphorous compound, and without any treatment with alkali, and there may, according to the concentration, be embodied in the fiber or added to the solution to neutralize the acid liberated in the reaction, acid binding or removing bodies such as sodium bicarbonate, calcium carbonate and the like. This method is also not only applicable to the natural cellulose fibers but also to the artificial silks and the like, and results in increasing their affinity for basic dyes.

White and colored or two colored effects may also be produced in a fabric by the local application or treatment to render certain portions of the cellulosic material immune to substantive dyestuffs and attractive to basic dyestuffs according to any predetermined design. Thus a reserve thickening or paste may be printed upon the fabric according to the predetermined design and then the fabric treated with the phosphorous compound solution either with previous alkalization or subsequent alkalization or without the same. If the alkali treatment is a treatment with alcoholic caustic alkali immunity to substantive dyes and increased affinity for basic dyes result. If a water solution of caustic alkali is employed or if the caustic alkali is omitted, a satisfactory immunity to substantive dyes is not obtained, but an increased affinity for basic dyestuffs occurs. If desired the alkalization of the fiber may be accomplished by printing a thickened alkali directly on the fabric in accordance with a predetermined design and then the local chemical changes brought about by immersion of the fabric in the solution of phosphorous compound and if desired a dyestuff may be printed on the fabric at the same time with the thickened alkali, or a thickened solution of the phosphorous compound may be printed on the fabric according to a predetermined design.

Thus the process may be used for the production of new materials of natural vegetable or artificial fibers, with pattern effects by the local application of the phosphorous compound by printing or applying the same in accordance with any predetermined design, whereupon the portions so acted upon by the phosphorous compound will be particularly resistant to substantive dyestuffs and relatively attractive to basic dyestuffs or simply have increased affinity for basic dyes alone, and upon subsequent dyeing, clouded or other variegated effects may be produced. While a phosphorous chlorine compound is preferred, nevertheless other halogens and other compounds of phosphorus may be used with more or less success.

While I have described my improvements in great detail and with respect to preferred forms thereof, I do not desire to be limited to such details or forms since many modifications and changes may be made and the invention embodied in widely different forms without departing from the spirit and scope thereof in its broader aspects. Hence I desire to cover all modifications and forms coming within the language or scope of any one or more of the appended claims.

What I claim as new and desire to secure by Letters Patent, is:

1. Method of modifying the dying properties of cellulosic fibers which consists in treating the fibers with alcoholic caustic alkali and acting on the same with a compound of the class consisting of phosphorous halogen compound and triphenyl-phosphate capable of making the cellulosic fibers relatively immune to substantive dyestuffs and relatively attractive to basic dyestuffs.

2. Method of modifying the dying properties of cellulosic fibers which consists in treating the fibers with alcoholic caustic alkali and acting on the same with a phosphorous halogen compound capable of making the cellulosic fibers relatively immune to substantive dyestuffs and relatively attractive to basic dyestuffs without previous mordanting.

3. Method of modifying the dying properties of cellulosic fibers which consists in treating the fibers with alcoholic caustic alkali and treating the fibers with a phosphorous halogen compound sufficiently to make the fibers relatively immune to substantive dyestuffs and relatively attractive to basic dyestuffs and removing the halogen acid formed.

4. A cellulosic fiber containing phosphorus capable of substantially resisting substantive dyestuffs and attracting basic dyestuffs, so that when the fiber is treated with substantive dyestuffs, it remains substantially uncolored thereby.

5. Method of modifying the dyeing properties of cellulosic fibers which consists in treating the same with a phosphorous halogen compound in the presence of an alcoholic solution of a caustic alkali material.

6. Method of making fabrics with variegated colored effects which consists in forming the fabric with cellulosic threads, some only of which have been treated with a compound of the class consisting of phosphorous halogen compounds and triphenyl-phosphate to render them relatively immune to substantive dyestuffs whereby when the fabric is treated with substantive dyestuffs the so treated threads remain substantially unaffected.

7. Method of making fabrics with variegated colored effects which consists in forming the fabric with cellulosic threads, some only of which have been first colored and then treated with a compound of the class consisting of phosphorous halogen compounds and triphenyl-phosphate to render them relatively immune to substantive dyestuffs whereby when the fabric is treated with substantive dyestuffs the so treated threads remain substantially unaffected.

8. In the method of producing colored designs on fabrics which step consists in taking a fabric of cellulosic threads and treating the same according to a predetermined desig with a compound of the class consisting of phosphorous halogen compounds and triphenyl-phosphate, and an alcoholic caustic alkali solution, whereby the cellulosic fiber at the places so treated is rendered relatively immune to substantive dyestuffs and relatively attractive to basic dyestuffs.

9. A fabric of cellulosic threads having certain portions thereof treated according to a predetermined design with a phosphorous halogen compound rendering the fiber of such treated portions substantially immune to substantive dyestuffs and relatively attractive to basic dyestuffs without the previous use of a mordant whereby when the fabric is treated with substantive dyestuffs the so treated threads remain substantially unaffected.

10. Threads of cellulosic material containing phosphorous whereby the threads are rendered substantially immune to substantive dyestuffs, so that when the threads are treated with substantive dyestuffs they remain substantially uncolored thereby.

11. Method of producing variegated designs on fabrics of cellulosic material which consists in printing a paste reverse material on the fabric according to a predetermined design and exposing the fabric to the action of a phosphorous halogen compound locally according to said design.

12. Method of modifying the dyeing properties of cellulosic fibers which consists in treating the fibers with a compound of the class consisting of phosphorous halogen compounds and triphenyl-phosphate capable of making the cellulosic fibers substantially immune to substantive dyestuffs and relatively attractive to basic dyestuffs and also treating with an acid binding material, so that when the fibers are treated with substantive dyestuffs they remain substantially uncolored thereby.

13. Method of modifying the dyeing properties of cellulosic fibers which comprises treating the cellulosic fibers with alcoholic caustic alkali, introducing the material thus treated into a solution of a compound of the class consisting of phosphorous halogen compounds and triphenyl-phosphate and allowing reaction between said compound and the material to occur whereby the material to occur whereby the material is rendered practically immune to substantive dyestuffs and has an increased affinity for basic dyestuffs.

14. A method of producing variegated designs on a fabric of cellulosic material which comprises printing a reserve on the fabric according to a predetermined design, treating the fabric with alcoholic caustic alkali solution, treating the fabric with a solution of a compound of the class consisting of phosphorous halogen compounds and triphenyl-phosphate whereby the unprinted portions of the fabric are rendered immune to substantive dyestuffs and have an increased affinity for basic dyestuffs, removing the reserve and dyeing the fabric to reproduce the design printed thereon.

15. A cellulosic fiber in which at least some of the cellulose has been subjected to caustic alkali deposited thereon from an alcoholic solution and to a phosphorous halogen compound, and which is relatively more resistant to substantive dyestuffs and more attractive to basic dyestuffs.

16. A fabric of cellulosic threads having certain portions thereof treated according to a predetermined design with a phosphorous halogen compound in the presence of a caustic alkali deposited thereon from an alcoholic solution of said alkali rendering the fiber of such treated portions relatively resistant to substantive dyestuffs and relatively attractive to basic dyestuffs.

17. Artificial silk fiber of regenerated cellulose in which at least some of the fiber has been subjected to a caustic alkali material deposited thereon from an alcoholic solution and treated with a phosphorous halogen compound, the fiber being relatively immune to substantive dyestuffs and relatively attractive to basic dyestuffs.

In testimony whereof, I have signed my name to this specification.

ALBERT BODMER.